United States Patent
Chen

(10) Patent No.: US 11,414,535 B2
(45) Date of Patent: Aug. 16, 2022

(54) HYDROPHOBIC THERMOPLASTIC STARCH COMPOSITE AND METHOD FOR MANUFACTURING THE SAME

(71) Applicant: Green World Biotech Materials Co., Ltd., Tainan (TW)

(72) Inventor: Shao Heng Chen, Tainan (TW)

( * ) Notice: Subject to any disclaimer, the term of this patent is extended or adjusted under 35 U.S.C. 154(b) by 436 days.

(21) Appl. No.: 16/533,783

(22) Filed: Aug. 7, 2019

(65) Prior Publication Data

US 2020/0048436 A1   Feb. 13, 2020

(30) Foreign Application Priority Data

Aug. 10, 2018 (TW) .................... 107127940

(51) Int. Cl.
| | |
|---|---|
| *C08L 3/02* | (2006.01) |
| *C08J 3/12* | (2006.01) |
| *B29C 48/00* | (2019.01) |
| *B29C 48/08* | (2019.01) |
| *C08J 5/18* | (2006.01) |
| *B29K 105/00* | (2006.01) |

(52) U.S. Cl.
CPC .............. *C08L 3/02* (2013.01); *B29C 48/022* (2019.02); *B29C 48/08* (2019.02); *C08J 3/12* (2013.01); *C08J 5/18* (2013.01); *B29K 2003/00* (2013.01); *B29K 2105/0038* (2013.01); *B29K 2105/0094* (2013.01); *B29K 2995/006* (2013.01); *C08J 2303/02* (2013.01); *C08J 2425/14* (2013.01); *C08J 2435/02* (2013.01); *C08J 2467/02* (2013.01); *C08L 2201/06* (2013.01); *C08L 2203/16* (2013.01); *C08L 2205/03* (2013.01); *C08L 2205/06* (2013.01)

(58) Field of Classification Search
CPC .... C08L 3/02; C08L 2201/06; C08L 2203/16; C08L 2205/03; C08L 2205/06; C08L 2203/14; C08L 2205/035; C08J 3/12; C08J 5/18; C08J 2303/02; C08J 2425/14; C08J 2435/02; C08J 2467/02; C08J 2303/04; B29C 48/04; B29C 48/05; B29C 48/44; B29C 48/92; B29C 48/022; B29C 48/08; B29K 2003/00; B29K 2104/038; B29K 2995/006
USPC ........................................ 264/211
See application file for complete search history.

(56) References Cited

U.S. PATENT DOCUMENTS

| | | | | |
|---|---|---|---|---|
| 6,231,970 B1 * | 5/2001 | Andersen | .................. | C08L 3/02 106/206.1 |
| 2006/0252901 A1 * | 11/2006 | Narayan | .................. | C08L 3/02 527/300 |

\* cited by examiner

*Primary Examiner* — Hannah J Pak
(74) *Attorney, Agent, or Firm* — IPR Works LLC

(57) ABSTRACT

The present invention provides a hydrophobic thermoplastic starch and method for manufacturing the same, to be used as granules for making biodegradable composites. The hydrophobic thermoplastic Starch of the invention is in a granule type, has the melt flow index in the range of 0.2-6 g/10 min at 160° C. and has 60-80 wt % of starch and the water content less than 9%.

8 Claims, 1 Drawing Sheet

HYDROPHOBIC THERMOPLASTIC STARCH COMPOSITE AND METHOD FOR MANUFACTURING THE SAME

BACKGROUND OF THE INVENTION a. Field of the Invention

The invention relates to a thermoplastic starch composite and method for manufacturing the same, particularly to a hydrophobic thermoplastic starch composite and method for manufacturing the same.

b. Description of the Related Art

Starch is a renewable, inexpensive, abundant biopolymer with the characteristics of biodegradability and long shelf life and thus is considered to be an excellent candidate to replace petrochemical polymers. However, in order to have starch become thermoplastic to be processed by the current existing plastic processing method, starch has to be modified due to its intermolecular and intramolecular hydrogen bonds. Modified starch as a thermoplastic starch composite is extensively developed and researched in the fields such as biodegradable food packaging to make various disposable products such as shopping bags, disposable tableware, foam cushioning materials, packaging bags and food containers, etc.

In general, becoming thermoplastic, natural starch requires water and a plasticizer (for example, urea, glycerin, sorbitol, etc.). The plasticizer can increase flexibility and improve processability. Furthermore, because starch is brittle and hydrophilic, it is not suitable as a plastic bag or food packaging material. Therefore, various modified starches have been researched and developed.

For example, the prior art I (CN 101942120) disclosed a starch based thermoplastic biodegradable material comprising a plant starch (vegetal starch), a modified plasticizer and a degradable polymer. However, the plant starch and the modified plasticizer need to be reacted firstly to obtain the modified starch and then the modified starch is mixed with the degradable polymer subjected to plasticization, polymerization, extrusion to form into granules, films or sheets through an extruder.

The prior art II (EP0397819) disclosed a method for preparing a homogeneous starch having a crystalline component less than 5%. The raw or natural starch and 10% of the additive are heated and melted to a molten state and the water content of the molten starch is reduced to less than 5% from the original water content about 17% by the additive. The vapor pressure of the additive and the starch is less than 1 bar at the temperature range around the melting point of the homogeneous starch. The prior art III (U.S. Pat. No. 6,235,816) disclosed a method for producing a mixture of thermoplastic starch and polymer using the homogeneous starch of the prior art II to obtain a thermoplastic composite. However, the prior art III uses the mixture of thermoplastic starch but not modified starch.

BRIEF SUMMARY OF THE INVENTION

In light of the above background, in order to fulfill the requirements of the industry, one object of the invention provides a hydrophobic thermoplastic starch composite and method for manufacturing the same. Compared to the conventional method using water or alcohol, the method according to the present invention uses a commonly seen vegetal starch as a main raw material to perform structural modification through a special mixing and extrusion technology to have starch molecules esterized and grafted with specific moieties to destroy crystallinity to give the starch hydrophobicity.

Furthermore, another object of the invention provides a method for manufacturing a hydrophobic thermoplastic starch composite having high dispersing ability, high plasticizing ability, and high temperature control. In the case of manufacturing the thermoplastic starch composite, the starch is modified in a dried state and does not need gelatinization in advance. Therefore, there is no overheated and coking phenomenon and the thermoplastic starch composite can be obtained with excellent quality.

In order to achieve the above purpose(s), one embodiment of the invention provides a hydrophobic thermoplastic starch composite, being of hydrophobic biodegradable granules, having a melt flow index in the range of 0.2-6 g/10 min at 160° C. and having 60-80 wt % of starch, water content less than 4.1%, and water contact angle being more than 65 degrees while the hydrophobic biodegradable granules are formed into a film; wherein the granules of the composite is formed by a reactive extrusion method using a starch composition including vegetal starch and modifier at a reaction temperature controlled in a range of a predetermined temperature±2° C., that is, between (predetermined temperature−2° C.) and (predetermined temperature+2° C.) to perform kneading and modification reaction to obtain the hydrophobic thermoplastic starch composite; and the predetermined temperature is between 120° C. and 170° C. and duration of performing kneading and modification reaction is less than 10 minutes. The modification includes esterification and polycondensation.

Furthermore, one other embodiment of the invention provides a biodegradable thermoplastic composite, being formed into granules and comprising a thermoplastic starch composite and a biodegradable resin; wherein the biodegradable resin is selected from the group consisting of the following or combination thereof: polybutylene succinate, polybutylene adipate terephthalate (PBAT), and polycaprolactone.

One other embodiment of the invention provides a method for manufacturing a thermoplastic starch composite, being a reactive extrusion method to use a starch composition including vegetal starch and modifier at a reaction temperature controlled in a range of a predetermined temperature±2° C., that is, between (predetermined temperature−2° C.) and (predetermined temperature+2° C.) to perform kneading and modification reaction to obtain the hydrophobic thermoplastic starch composite; and the predetermined temperature is between 120° C. and 170° C. and duration of performing kneading and modification reaction is less than 10 minutes.

According to the present invention, the hydrophobic thermoplastic starch composite is thermoplastic and reusable while retaining biodegradable properties. Furthermore, the thermoplastic starch composite of the invention can be mixed with general plastics to form a partially decomposable composite material with high starch content and can also be blended with a biodegradable plastic to obtain a fully biodegradable composite material. The composite of the present invention has excellent mechanical properties and processability and can be processed by injection, extrusion, film blowing, vacuum forming and foam forming to produce the products such as shopping bags, disposable tableware, foam cushioning materials, packaging bags and food containers, etc. The method according to the present invention has the merits of good productivity, low manufacturing cost and low processing energy.

DETAILED DESCRIPTION OF THE INVENTION

Figure 1:
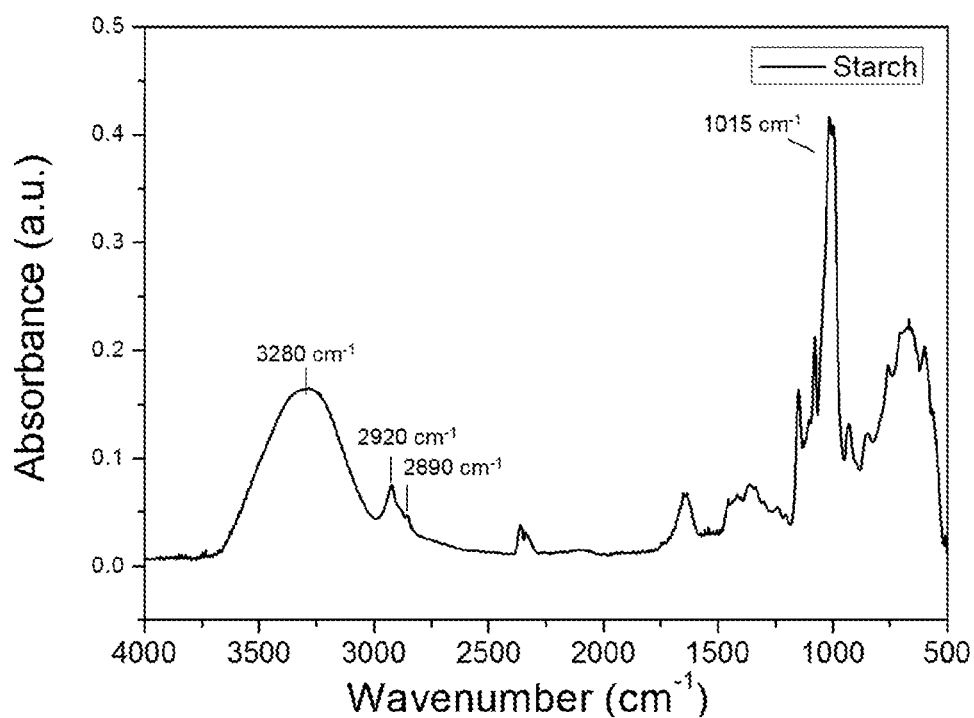
FIG. 1 shows a FTIR spectrum of starch before modification.

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the invention. Also, it is to be understood that the phraseology and terminology used herein are for the purpose of description and should not be regarded as limiting.

According to one embodiment of the invention, a hydrophobic thermoplastic starch composite is disclosed. It is of hydrophobic biodegradable granules and has a melt flow index in the range of 0.2-6 g/10 min at 160° C. The composite has 60-80 wt % of starch, water content less than 4.1%, and water contact angle being more than 65 degrees while the hydrophobic biodegradable granules are formed into a film. The granules of the composite is formed by a reactive extrusion method using a starch composition including vegetal starch and modifier at a reaction temperature controlled in a range of a predetermined temperature±2° C., that is, between (predetermined temperature−2° C.) and (predetermined temperature+2° C.) to perform kneading and modification reaction to obtain the hydrophobic thermoplastic starch composite; and the predetermined temperature is between 120° C. and 170° C. and duration of performing kneading and modification reaction is less than 10 minutes. The modification includes esterification and polycondensation.

When the melt flow index is in the range of 0.2-6 g/10 min at 160° C., the composite has good processability at the molten state, compared to the unmodified starch, and can be mixed with a general plastic easily to obtain a biodegradable thermoplastic composite material.

When the melt flow index is in the range of 0.2~6 g/10 min at 160° C., the composite has good processability at the molten state, compared to the unmodified starch, and can be mixed with a general plastic easily to obtain a biodegradable thermoplastic composite material.

The process of kneading and modification reaction can be carried out by a plurality of stages or in a plurality of blocks of a manufacturing apparatus (or machine). Therefore, the above-mentioned predetermined temperatures can be either different to each other or the same. Each temperature is controlled within ±2° C., preferably ±1° C. Thus, it is possible to prevent the starch composition from being overheated and coked due to excessive frictional heat with the manufacturing apparatus. Preferably, the extruder is used to conduct the kneading and modification reaction because of the high conversion efficiency (high modification ratio), no by-products (such as water), high kneading efficiency, and high dispersion efficiency. Particularly, a planetary extruder can be used because of its high precision temperature control, high kneading efficiency, and high dispersion efficiency. Furthermore, the duration of the process of kneading and modification reaction is less than 10 minutes, preferably 3~5 minutes.

Figure 2:
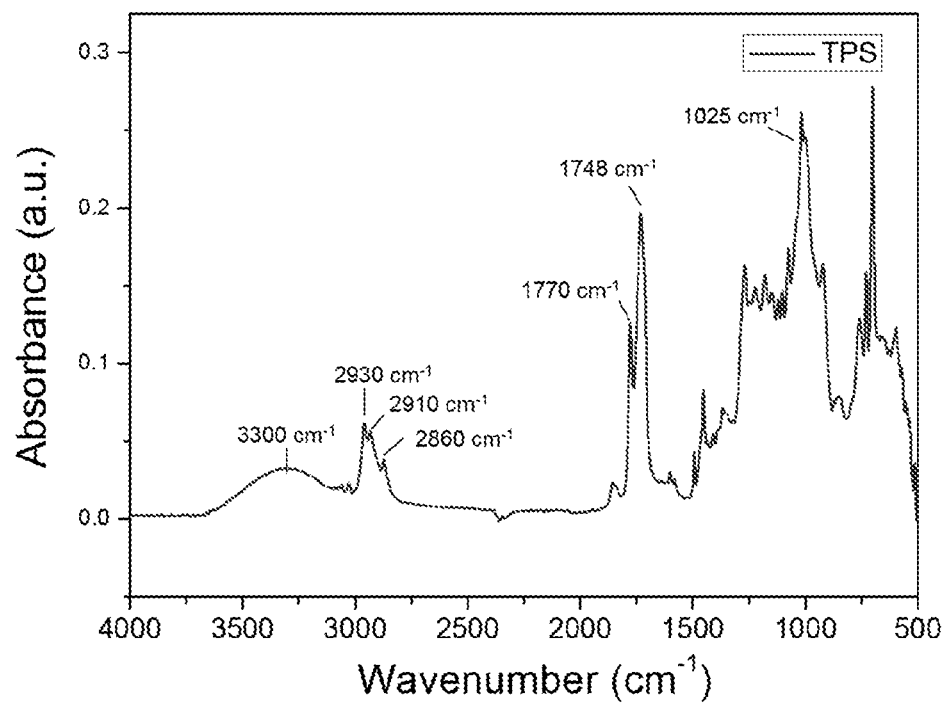
FIG. 2 shows a FTIR spectrum of starch after modification according to one embodiment of the invention.

Furthermore, according to the present invention, the natural starch is modified and grafted to obtain a modified starch, such as an esterified starch. The produced granules are hydrophobic and the water contact angle of the film formed from the modified starch is more than 65°, preferably 65-98°. FIG. 1 shows a FTIR spectrum of starch before modification. FIG. 2 shows a FTIR spectrum of starch after modification according to one embodiment of the invention. Comparing FIG. 2 with FIG. 1, the modified starch has the characteristic absorption peak of CO moiety at about 1770 and 1748 $cm^{-1}$, indicating the ester moiety, and has the lower OH characteristic absorption peak at about 3300 $cm^{-1}$.

The starch composition further comprises a plasticizer and a binder. The vegetal starch in the starch composition includes starch selected from the group consisting of the following or combination thereof: tapioca starch, potato starch, wheat starch, taro starch, corn starch, and lotus root starch. The modifier in the starch composition is selected from the group consisting of the following or combination thereof: anhydrides, epoxy resins and isocyanates. For example, the modifier includes one selected from the group consisting of the following or combination thereof: maleic anhydride, styrene-maleic anhydride copolymer, t-butyl glycidyl ether, glycidyl lauryl ether, glycidyl tridecyl ether, glycidyl tetradecyl ether, polymer of bisphenol A reacting with epichlorohydrin, epoxy resins and diphenylmethane diisocyanate. The plasticizer is selected from the group consisting of the following or combination thereof: epoxidized soybean oil, vegetable oil, and citrate derivative. The binder is selected from the group consisting of the following or combination thereof: polybutylene succinate, polybutylene adipate terephthalate, and polycaprolactone.

In one embodiment, in the composite, wherein the starch composition includes 60-80 wt % of the vegetal starch, 5-20 wt % of the modifier, 4-20 wt % of the plasticizer, and 2-20 wt % of the binder.

In another embodiment of the present invention, a biodegradable thermoplastic composite is disclosed. The composite is formed into granules and comprises a thermoplastic starch composite and a biodegradable resin. The biodegradable resin is selected from the group consisting of the following or combination thereof: polybutylene succinate, polybutylene adipate terephthalate, and polycaprolactone. The biodegradable thermoplastic composite includes 20-50 wt % of the thermoplastic starch composite and can comprise various additives, such as antioxidants (such as hindered phenols, thioesters and phosphite antioxidants), lubricants (such as stearic acid and hydrocarbon waxes) and inorganic additives (such calcium carbonate and silicon oxide).

In one another embodiment of the present invention, a method for manufacturing a thermoplastic starch composite, being a reactive extrusion method to use a starch composition including vegetal starch and modifier at a reaction temperature controlled in a range of a predetermined temperature±2° C., that is, between (predetermined temperature−2° C.) and (predetermined temperature+2° C.) to perform kneading and modification reaction to obtain the hydrophobic thermoplastic starch composite; and the predetermined temperature is between 120° C. and 170° C. and duration of performing kneading and modification reaction is less than 10 minutes.

Specifically, the above method comprises the following steps: drying the starch composition to have water content less than 1%; mixing the starch composition by stirring until becoming homogeneous to obtain a homogeneous mixture of the starch composition; kneading and modifying the homogeneous mixture of the starch composition to obtain a modified kneaded mixture; and performing extrusion and granulation of the modified kneaded mixture to obtain hydrophobic biodegradable granules.

The step of kneading and modifying can use a machine selected from the group consisting of the following or combination thereof: kneader, single screw extruder, twin screw extruder, and planetary extruder. Besides, the step of kneading and modifying can be performed using the kneader and the extruder.

The step of drying can be performed using any conventional drying method, for example using a vacuum dry method.

Stirring can be performed using a high speed mixer at a speed of 600~1000 rpm.

In a preferred embodiment, the step of kneading and modifying is performed using a planetary extruder having one set of main screw and a plurality of planetary screws at a speed of 20-200 rpm. The planetary extruder comprises a plurality of temperature control blocks between a material inlet and a material outlet; the temperature control blocks are independently controlled at a plurality of setting temperatures; and the absolute value of the temperature difference between each setting temperature and the temperature of the material in the temperature control block is less than 2° C. In each block of the planetary extruder, the temperature can and the vapor pressure can be adjusted and various mechanisms such gas exhaust to assist the process can be installed.

According to the present invention, the method uses a commonly seen vegetal starch as a main raw material to perform structural modification through a special mixing and extrusion technology to have starch molecules esterized and grafted with specific moieties to destroy crystallinity to give the starch hydrophobicity. From the measurements of the water content and contact angle, it is found that the water content of the modified starch is reduced to 8-4% from the original values of 13-15% and the surface contact angle is raised to 65°-95° from the original value of 35.5°.

Examples 1~5 and Comparison example 1~2: manufacturing thermoplastic starch composites (1) Each component in the composition is taken according to the ratios shown in Table 1. The vegetal starch (tapioca, purchased from Thailand-Taihua company; triangle brand tapioca starch) is dried to a water content less than 1.0 wt %. The dried starch is poured into a high-speed mixer and the modifier 1 (styrene-maleic anhydride copolymer; purchased from Aldrich; XIRAN), plasticizer 1 (citrate derivative) and the binder 1 (PBAT) are sequentially added. The mixture is mixed at 600~1000 rpm for 5~10 minutes.

(2) The mixture is poured in the mixing extruder (planetary extruder) and four screw temperatures of the planetary extruder are set at 120/140/150/155° C. at 20~200 rpm.

(3) The thermoplastic starch composite is obtained by granulation. The obtained composite has a starch content of 70~80%.

In Tables 1 and 2, the water content is measured by placing the test sample in an environment at a temperature of 25° C. and a relative humidity of 50% for 72 hours and then using a moisture analyzer (FD-610 Infrared Rapid Moisture Analyzer; manufactured by Zhongcan Technology Co.) to measure the weight before drying and the weight after drying (setting the temperature to 120° C.). The water content of the test sample can be calculated.

Manufacturing starch-based biodegradable composites (4) The previously prepared thermoplastic starch composite is mixed with different ratios of biodegradable resins (for example, PBAT; purchased from BASF; Ecoflex), an antioxidant (sodium 2,2-methylene-bis(4,6-di-t-butylphenyl)phosphate; purchased from Hangzhou Hairui Chemical Co., Ltd.), a lubricant (stearic acid) and an inorganic additive and the mixture is dried at 80° C. for 6 hours.

(5) The mixture is poured in the mixing extruder (planetary extruder) and five screw temperatures of the planetary extruder are set at 120/150/160/150/140° C. at 100-400 rpm. Mixing and granulation are conducted to obtain a starch-based biodegradable composite.

(6) The obtained granules are dried at 80° C. for 6 hours and then subjected to a subsequent process such as injection, extrusion, film blowing, vacuum forming and foam forming. The adding percentages of the thermoplastic starch composite, biodegradable resins, antioxidant, lubricant, inorganic additive can be varied depending on the products to be made. For example, the ratio of the thermoplastic starch composite:biodegradable resins:antioxidant:lubricant:inorganic additive (by weight) can be 20-50%: 20-40%: 0.1-1.0%: 0.3-3.0%: 5-20%.

TABLE 1

| | Example | | | | | | | | | | |
|---|---|---|---|---|---|---|---|---|---|---|---|
| | C1 | C2 | C1 | E2 | E3 | E4 | E5 | E6 | E7 | E8 | E9 |
| Vegetal starch (phr) | 100 | 100 | 100 | 100 | 100 | 100 | 100 | 100 | 100 | 100 | 100 |
| Modifier 1 (phr) | — | — | 15 | 20 | 10 | 10 | 10 | 20 | 10 | 10 | 15 |
| Plasticizer 1 (phr) | — | — | 12 | 12 | 12 | 20 | 10 | 20 | 10 | 10 | 15 |
| Binder 1 (phr) | — | 20 | 8 | 8 | 8 | 8 | 8 | 8 | 15 | 20 | 20 |
| Starch content (%) | 100 | 83 | 74 | 71 | 77 | 72 | 78 | 67.5 | 74 | 71 | 66 |
| Water content (%) | 14.6 | 10.8 | 6.2 | 5.5 | 7.9 | 7.5 | 9.0 | 4.1 | 6.8 | 5.2 | 4.5 |
| Contact angle (°) | 35.5 | 48.9 | 89.8 | 92.1 | 67.5 | 70.4 | 51.2 | 95.8 | — | — | — |

TABLE 1-continued

| | \multicolumn{11}{c}{Example} | | | | | | | | | | |
|---|---|---|---|---|---|---|---|---|---|---|---|
| | C1 | C2 | C1 | E2 | E3 | E4 | E5 | E6 | E7 | E8 | E9 |
| Melt flow index (g/10 min) | — | 2.8 | 1.4 | 4.8 | 2.2 | 4.5 | 0.5 | 5.2 | — | — | — |

In the above table, "—" indicates no addition or no measurement and "phr" indicates parts per hundreds of resin.

As shown in Table 1, the thermoplastic starch composite cannot be prepared using only vegetal starch in comparison example 1. In examples 1-5 (E1-E5), the hydrophobic thermoplastic starch composite can be prepared, and the starch-based biodegradable composites can be successfully produced. The material is then subjected to subsequent processing including injection, extrusion, film blowing, vacuum forming and foaming. It can be found from the water content is as high as 14.6% and the water contact angle is 35.5° indicating high hydrophilicity in comparison example 1 (C1). In comparison example 2 (C2), the vegetal starch is not modified and the hydrophilicity is lower for the starch based biodegradable composite when the vegetal starch is mixed with the biodegradable resin but the water content is as high as 10.8% and the water contact angle is 48.9°.

In examples 1-3 (E1-E3), the amount of the binder (PBAT) and the plasticizer (citrate derivative) is fixed to see the effect of the modifier (styrene-maleic anhydride copolymer) on the hydrophilicity of the thermoplastic starch composite. When the modifier increases from 10 phr to 20 phr, the water content reduces from 7.9% to 5.5% and the contact angle increases from 67.5° to 92.1°. In examples 4-5, the amount of the binder and the modifier is fixed to see the effect of plasticizer on the hydrophilicity. When the plasticizer increases from 10 phr to 20 phr, the water content reduces from 9.0% to 7.5% and the contact angle increases from 51.2° to 70.4°. The melt flow index increases from 0.5 g/10 min to 4.5 g/10 min. Examples 5, 7 and 8 compare the effect of the binder. When the binder increases from 8 phr to 20 phr, the water content reduces from 9.0% to 5.2%

(1) Each component in the composition is taken according to the ratios shown in Table 2. The vegetal starch (tapioca, purchased from Thailand-Taihua company; triangle brand tapioca starch) is dried to a water content less than 1.0 wt %. The dried starch is poured into a high-speed mixer and the modifier 1 (styrene-maleic anhydride copolymer; purchased from Aldrich; XIRAN), modifier 2 (epoxy resin; purchased from Nanya plastic or Changchun chemical Co.), plasticizer 1 (citrate derivative), plasticizer 2 (general grade epoxidized soybean oil; purchased from Changchun chemical Co.), the binder 1 (PBAT; purchased from BASF; Ecoflex), and binder 2 (poly(butylene succinate); purchased from Xinjiang Blue Mountain River company; TUNHE) are sequentially added. The mixture is mixed at 600-1000 rpm for 5-10 minutes.

(2) The mixture is poured in the mixing extruder (planetary extruder) and four screw temperatures of the planetary extruder are set at 120/140/150/155° C. at 20-200 rpm.

(3) The thermoplastic starch composite is obtained by granulation. The obtained composite has a starch content of 70-80%.

TABLE 2

| | \multicolumn{11}{c}{Example} | | | | | | | | | | |
|---|---|---|---|---|---|---|---|---|---|---|---|
| | E10 | E11 | E12 | E13 | E14 | E15 | E16 | E17 | E18 | E19 | E20 |
| Vegetal starch (phr) | 100 | 100 | 100 | 100 | 100 | 100 | 100 | 100 | 100 | 100 | 100 |
| Modifier 1 (phr) | 15 | 15 | 15 | 13.3 | 13.3 | 13.3 | 2 | — | — | 4 | 8.9 |
| Modifier 2 (phr) | 10 | 10 | 10 | 8.9 | 8.9 | 8.9 | 4 | 8.9 | 8.9 | 8.9 | 8.9 |
| plasticizer 1 (phr) | — | — | — | — | — | — | — | — | — | — | 2 |
| plasticizer 2 (phr) | — | — | 4 | — | — | — | 12 | 10.6 | — | — | 2 |
| Binder 1 (phr) | 10 | — | — | 13.3 | 6.7 | — | 13.3 | — | 13.3 | 13.3 | 13.3 |
| Binder 2 (phr) | — | 10 | — | — | — | — | — | 15 | — | — | — |
| Starch content (%) | 71.5 | 71.5 | 75.1 | 71.0 | 75.1 | 79.6 | 72.1 | 71.5 | 81.3 | 78.3 | 71.2 |
| Water content (%) | 3.2 | 2.8 | 5.2 | 1.9 | 3.3 | 5.3 | 0.4 | 2.5 | 3.6 | 1.6 | 1.4 |
| Contact angle (°) | 91.2 | 93.7 | 69.9 | 102.5 | 90.8 | 71.6 | 104.4 | 92.1 | 90.8 | 100.1 | 99.8 |
| Melt flow index (g/10 min) | 0.8 | 1.3 | — | 2.6 | 1.2 | — | 2.9 | 5.5 | 0.9 | 1.5 | 4.9 |

In the above table, "—" indicates no addition or no measurement and "phr" indicates parts per hundreds of resin.

Examples 10 and 11 (E10-E11) compare two different binders (styrene-maleic anhydride copolymer and epoxy resin) without adding the plasticizer to see the effect of the two different binders on the hydrophilicity. It is found that the water content is 2.8-3.2%. Example 12 (E12) shows the modifier and the plasticizer can modify the starch even with no binder. Examples 13-15 (E13-E15) compares the effect of the binder by fixing the amount of the two modifiers. In example 15, the water content is 5.3% and the contact angle is 71.6° at the condition of only adding the modifier. Examples 16-19 (E16-E19), the modification of starch is taken place at the low adding amount of the modifier (total<10 phr). From the above result, the hydrophobic granules can only obtained in the presence of the modifier. The addition of the plasticizer and the binder can promote the efficiency of the modification to further decrease the water content of the composite and increase the melt flow index.

In conclusion, according to the present invention, the hydrophobic thermoplastic starch composite is thermoplastic and reusable while retaining biodegradable properties. Furthermore, the thermoplastic starch composite of the invention can be mixed with general plastics to form a partially decomposable composite material with high starch content and can also be blended with a biodegradable plastic to obtain a fully biodegradable composite material. The composite of the present invention has excellent mechanical properties and processability and can be processed by injection, extrusion, film blowing, vacuum forming and foam forming to produce the products such as shopping bags, disposable tableware, foam cushioning materials, packaging bags and food containers, etc. The method according to the present invention has the merits of good productivity, low manufacturing cost and low processing energy.

The foregoing description of the preferred embodiments of the invention has been presented for purposes of illustration and description. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated.

What is claimed is:

1. A hydrophobic thermoplastic starch composite, being of hydrophobic biodegradable granules, having a melt flow index in the range of 0.2-6 g/10 min at 160° C. and having 60-80 wt % of starch, water content less than 4.1%, and water contact angle being more than 65 degrees while the hydrophobic biodegradable granules are formed into a film;
    wherein the granules of the composite is formed by a reactive extrusion method using a starch composition including vegetal starch and modifier at a reaction temperature controlled in a range of a predetermined temperature±2° C., that is, between (predetermined temperature−2° C.) and (predetermined temperature+2° C.) to perform kneading and modification reaction to obtain the hydrophobic thermoplastic starch composite;
    the predetermined temperature is between 120° C. and 170° C. and duration of performing kneading and modification reaction is less than 10 minutes;
    the starch composition further comprises a plasticizer and a binder:
    the modifier in the starch composition is selected from the group consisting of the following or combination thereof: anhydrides, epoxy resins and isocyanates; and
    the plasticizer is selected from the group consisting of the following or combination thereof: epoxidized soybean oil, vegetable oil, and citrate derivative.

2. The composite as claimed in claim 1, wherein the vegetal starch in the starch composition includes starch selected from the group consisting of the following or combination thereof: tapioca starch, potato starch, wheat starch, taro starch, corn starch, and lotus root starch.

3. The composite as claimed in claim 1, wherein the modifier includes one selected from the group consisting of the following or combination thereof: maleic anhydride, styrene-maleic anhydride copolymer, t-butyl glycidyl ether, glycidyl lauryl ether, glycidyl tridecyl ether, glycidyl tetradecyl ether, polymer of bisphenol A reacting with epichlorohydrin, and diphenylmethane diisocyanate.

4. The composite as claimed in claim 1, wherein the binder is selected from the group consisting of the following or combination thereof: polybutylene succinate, polybutylene adipate terephthalate, and polycaprolactone.

5. The composite as claimed in claim 1, wherein the starch composition includes 60-80 wt % of vegetal starch, 5-20 wt % of modifier, 4-20 wt % of plasticizer, and 2-20 wt % of binder.

6. A biodegradable thermoplastic composite, being formed into granules and comprising a thermoplastic starch composite and a biodegradable resin; wherein the biodegradable resin is selected from the group consisting of the following or combination thereof: polybutylene succinate, polybutylene adipate terephthalate, and polycaprolactone; the biodegradable thermoplastic composite includes 20-50 wt % of the thermoplastic starch composite; the thermoplastic starch composite is of hydrophobic biodegradable granules, has a melt flow index in the range of 0.2-6 g/10 min at 160° C. and having 60-80 wt % of starch, water content less than 4.1%, and water contact angle being more than 65 degrees while the hydrophobic biodegradable granules are formed into a film;
    wherein the granules of the composite is formed by a reactive extrusion method using a starch composition including vegetal starch and modifier at a reaction temperature controlled in a range of a predetermined temperature±2° C., that is, between (predetermined temperature−2° C.) and (predetermined temperature+2° C.) to perform kneading and modification reaction to obtain the hydrophobic thermoplastic starch composite;
    the predetermined temperature is between 120° C. and 170° C. and duration of performing kneading and modification reaction is less than 10 minutes;
    the starch composition further comprises a plasticizer and a binder:
    the modifier in the starch composition is selected from the group consisting of the following or combination thereof: anhydrides, epoxy resins and isocyanates; and
    the plasticizer is selected from the group consisting of the following or combination thereof: epoxidized soybean oil, vegetable oil, and citrate derivative.

7. The composite as claimed in claim 6, wherein the vegetal starch in the starch composition includes starch selected from the group consisting of the following or combination thereof: tapioca starch, potato starch, wheat starch, taro starch, corn starch, and lotus root starch.

8. The composite as claimed in claim 6, wherein the starch composition includes 60-80 wt % of vegetal starch, 5-20 wt % of modifier, 4-20 wt % of plasticizer, and 2-20 wt % of binder.

* * * * *